United States Patent
Hirooka et al.

(10) Patent No.: US 8,869,647 B2
(45) Date of Patent: Oct. 28, 2014

(54) STEERING APPARATUS

(75) Inventors: Kouji Hirooka, Gunma-ken (JP); Suguru Sugishita, Gunma-ken (JP)

(73) Assignee: Yamada Manufacturing Co., Ltd., Kiryu-shi, Gunma-ken (JP)

( * ) Notice: Subject to any disclaimer, the term of this patent is extended or adjusted under 35 U.S.C. 154(b) by 187 days.

(21) Appl. No.: 13/426,502

(22) Filed: Mar. 21, 2012

(65) Prior Publication Data
US 2013/0247708 A1    Sep. 26, 2013

(30) Foreign Application Priority Data
Mar. 26, 2011   (JE) .................................. 2011-069043

(51) Int. Cl.
*B62D 1/18*    (2006.01)

(52) U.S. Cl.
USPC ................................ 74/493; 74/567; 280/775

(58) Field of Classification Search
USPC ................. 74/493, 567; 254/104; 403/374.1, 403/374.2, 374.5; 280/775
See application file for complete search history.

(56) References Cited

U.S. PATENT DOCUMENTS

| | | | | |
|---|---|---|---|---|
| 3,238,797 A * | 3/1966 | Coughren | .......................... | 74/55 |
| 5,377,555 A * | 1/1995 | Hancock | .......................... | 74/493 |
| 6,851,331 B2 * | 2/2005 | Kuroumaru et al. | ............ | 74/493 |
| 7,717,011 B2 * | 5/2010 | Hirooka | .......................... | 74/493 |
| 2002/0023515 A1 | 2/2002 | Kuroumaru et al. | | |

FOREIGN PATENT DOCUMENTS

JP    2002-059851 A    2/2002

* cited by examiner

*Primary Examiner* — William C Joyce
(74) *Attorney, Agent, or Firm* — McGinn IP Law Group, PLLC

(57) ABSTRACT

A steering apparatus includes a fixed bracket, a fastener, a primary cam that rotates with a rotation operation of the fastener, and a secondary cam that is non-rotatably attached to a fixed side portion and is in contact with the primary cam. Cam operating portions each including an inclined surface portion, a high level surface, and a contact protrusion are formed at regular intervals along a circumferential direction on a base flat surface of each of the primary cam and the secondary cam, and the inclined surface portion is constituted by a low gradually inclined surface, a middle sharply inclined surface, and a high gradually inclined surface arranged in this order from the base flat surface toward the high level surface.

8 Claims, 4 Drawing Sheets

Fig.1A
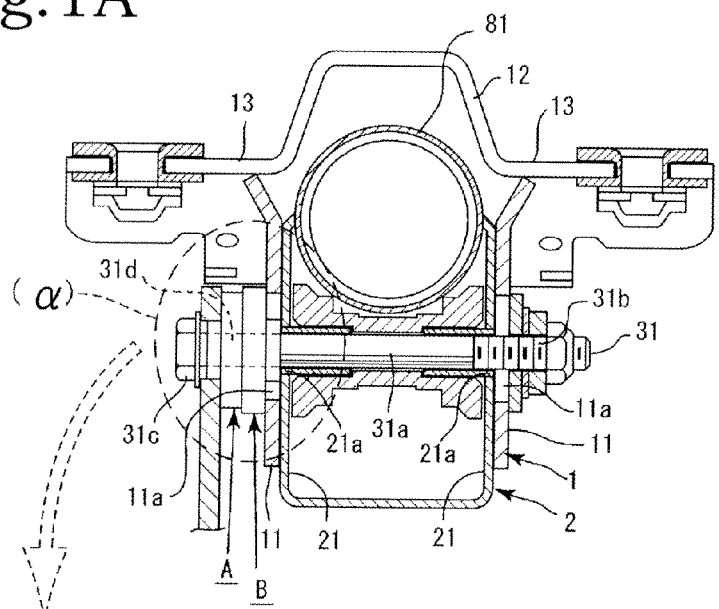
Fig.1B
ENLARGED VIEW OF α PART
Fig.1C
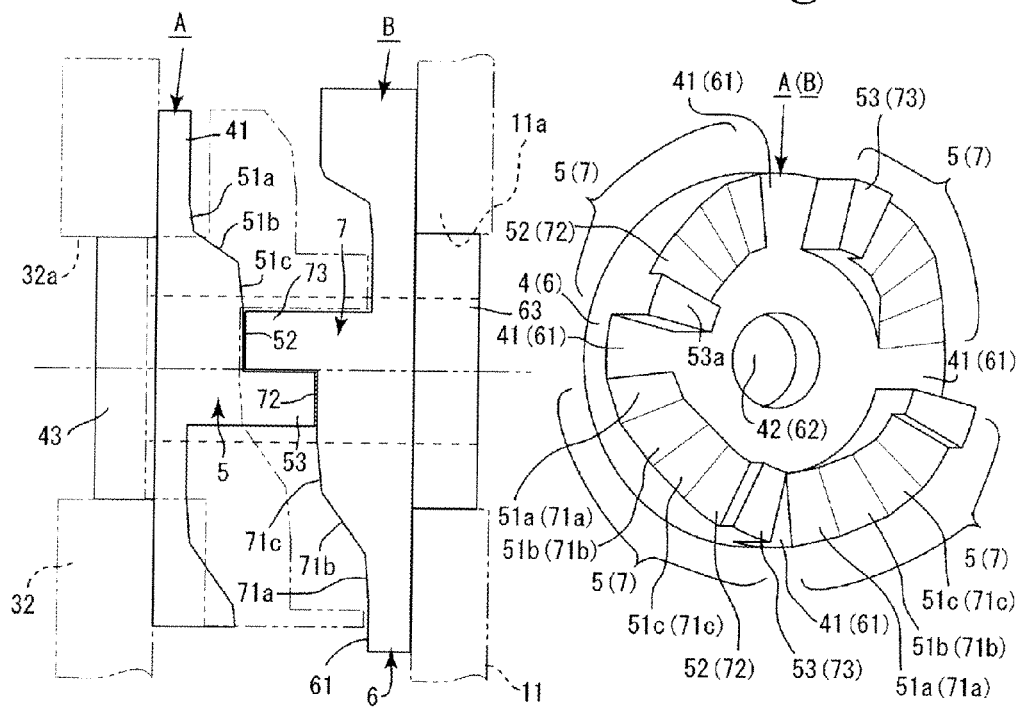

ENLARGED PERSPECTIVE VIEW OF β PART

VIEW TAKEN ALONG ARROWS X1-X1

ENLARGED VIEW OF γ PART
$\theta a < \theta c < \theta b$

Fig.3A
Fig.3B
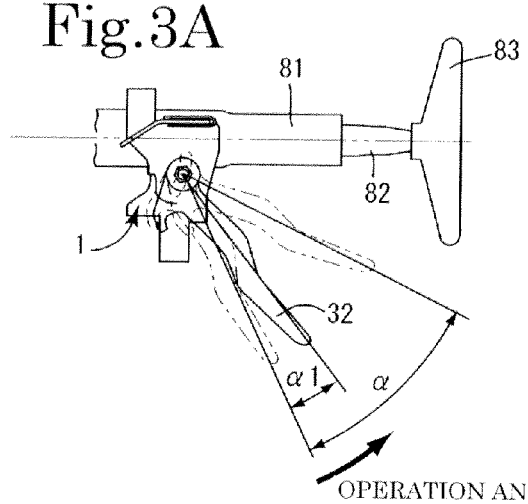
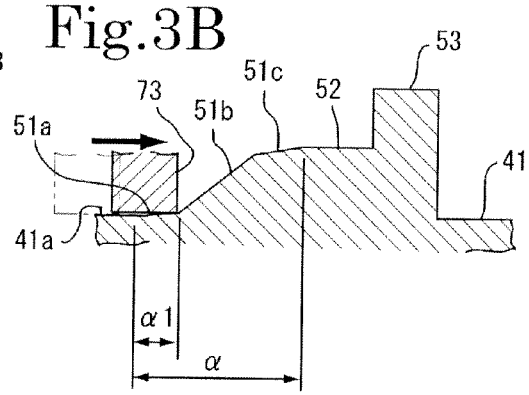
OPERATION ANGLE
OF OPERATION HANDLE
Fig.3C
Fig.3D
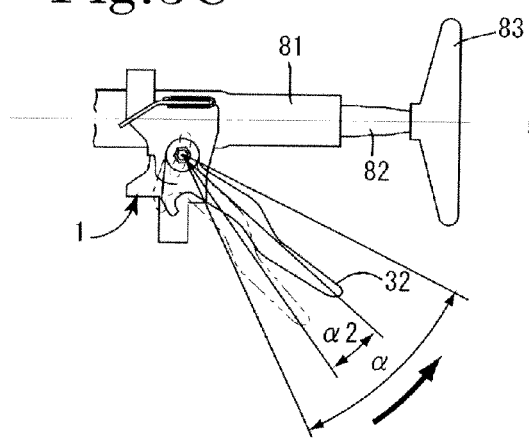
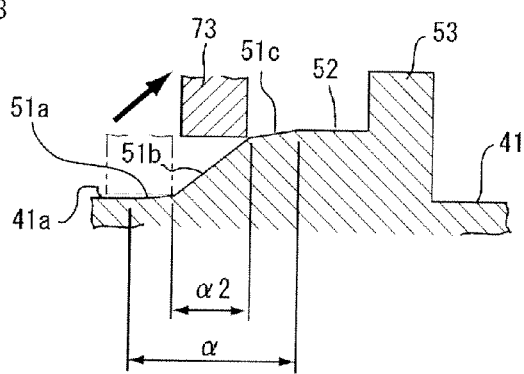
OPERATION ANGLE
OF OPERATION HANDLE
Fig.3E
Fig.3F
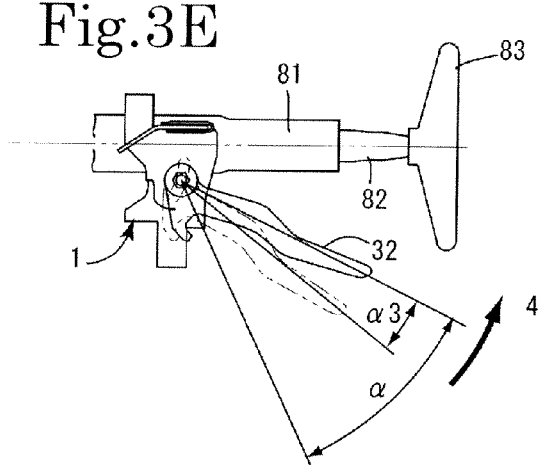
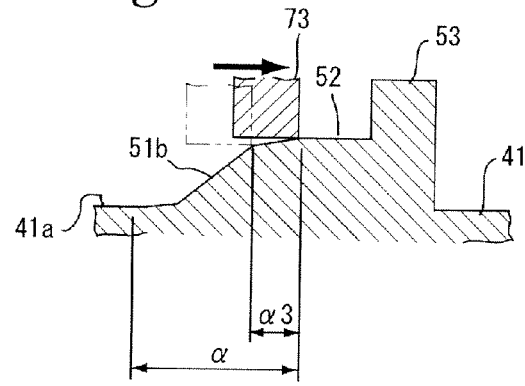

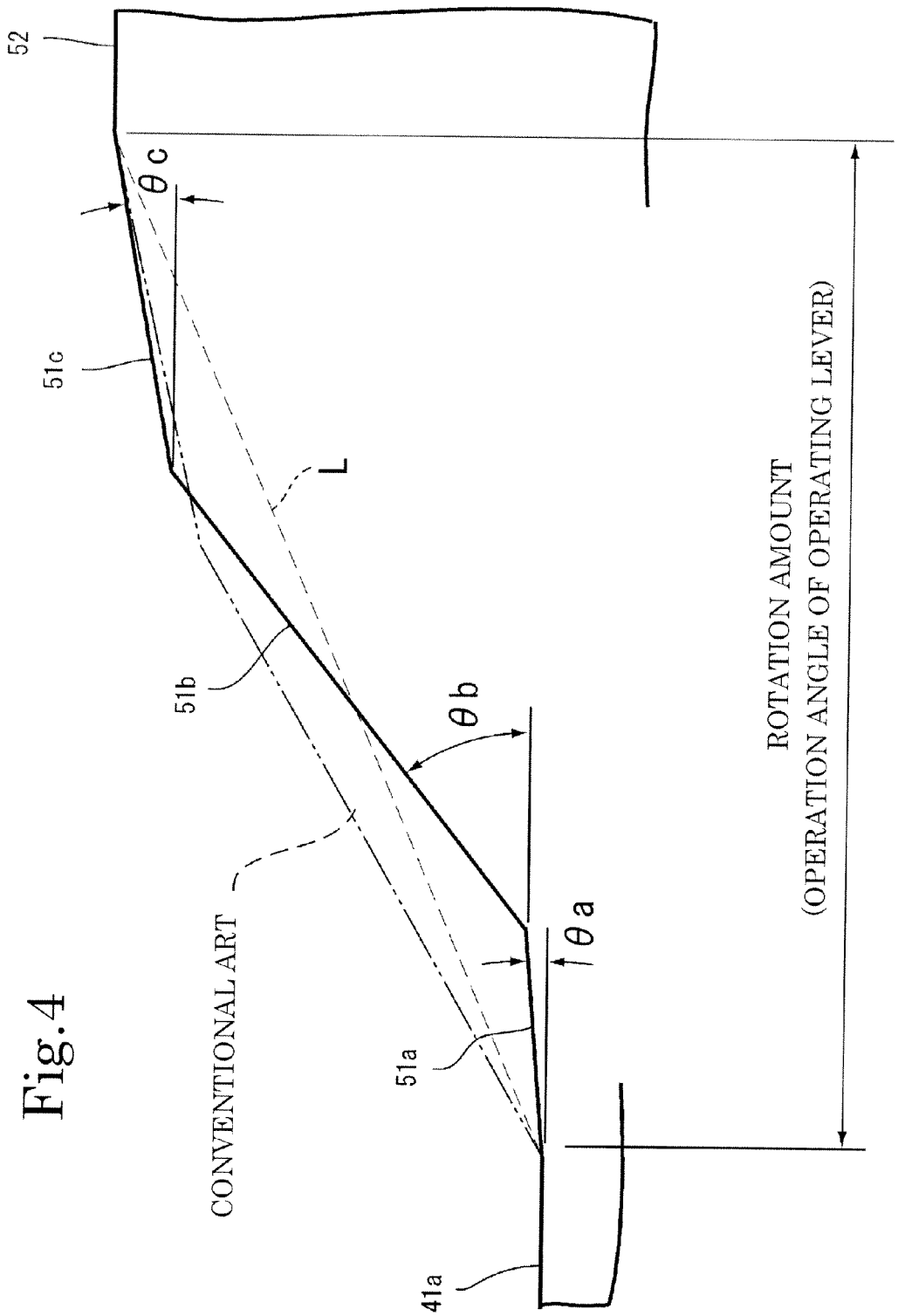

STEERING APPARATUS

BACKGROUND OF THE INVENTION

1. Field of the Invention

The present invention relates to a steering apparatus capable of improving operability of an operating lever in locking and unlocking.

2. Description of the Related Art

Conventionally, there have been developed various steering apparatuses each having tilting and telescoping functions. In particular, Japanese Patent Application Laid-open No. 2002-59851 discloses a steering apparatus equipped with a cam mechanism. The specific content of Japanese Patent Application Laid-open No. 2002-59851 is as follows. On an opposing surface 22a of a cam 22 that opposes a cam follower 21, there are provided a pair of first positioning portions 26 for positioning the cam follower 21 in unlocking and a pair of second positioning portions 27 for positioning the cam follower 21 in locking so as to oppose each other with the central axis line of the cam 22 (a central axis line C of a support shaft 15) interposed therebetween (see FIG. 3A in Japanese Patent Application Laid-open No. 2002-59851).

Between the first and second positioning portions 26 and 27, there are formed a flat surface with which the cam follower 21 is engaged when tilt lock is released, a flat surface with which the cam follower 21 is engaged when the tilt lock is established, and a cam surface 28 that connects the flat surfaces. On the other hand, on an opposing surface 21a of the cam follower 21 that opposes the cam 22, there are formed a pair of trapezoidal protrusions 31 that come slidably in contact with the positioning portions 26 and 27 and the cam surface 28 of the cam 22 (see FIG. 3B of Japanese Patent Application Laid-open No. 2002-59851).

The cam surface 28 includes a first inclined portion 29 having a relatively large inclination angle and a second inclined portion 30 having a relatively small inclination angle, and the second inclined portion 30 is positioned in a rear region of a stroke of an operating lever in fastening (see FIG. 4A of Japanese Patent Application Laid-open No. 2002-59851). Thus, by providing the inclined portions 29 and 30 on the cam surface 28, it is possible to reduce an operating force of an operating lever 16 without significantly increasing the range of an operation angle of the operating lever 16.

In particular, in order to cope with the rear region of the stroke in a fastening direction of the operating lever 16 where an operating torque tends to be large, the second inclined portion 30 having a relatively small inclination is provided on the cam surface 28. With the arrangement, the operating torque of the operating lever 16 in the rear region of the fastening stroke is reduced, and the operability of the operating lever 16 is improved.

Herein, the shape of a cam surface monotonically inclined from the beginning to the end that is widely used conventionally is defined as a virtual inclined line L constituted by a single straight line that connects the beginning of the cam surface 28 and the end thereof. In Japanese Patent Application Laid-open No. 2002-59851, the first inclined portion 29 and the second inclined portion 30 formed on the cam surface 28 are formed at positions (regions) above the virtual inclined line L at positions corresponding to the virtual inclined line L (see FIG. 4). The rotation amount of the cam follower 21 in the virtual inclined line L is the same as that in the cam surface 28 of Japanese Patent Application Laid-open No. 2002-59851, and the operation angle of the operating lever 16 in the virtual inclined line L is also the same as that in the cam surface 28 thereof.

In Japanese Patent Application Laid-open No. 2002-59851, in contrast to the virtual inclined line L monotonically inclined from the beginning to the end that is widely used conventionally, the inclined portions 29 and 30 are formed. The second inclined portion 30 in the rear region of the stroke of the operating lever 16 is a region where the operating force of the operating lever 16 is high as compared with that of the first inclined portion 29 in the front region of the stroke. The second inclined portion 30 having an inclination smaller than that of the virtual incline line L is provided in the rear region of the stroke, and the operating force of the operating lever 16 in the rear region of the fastening stroke is reduced without making the operation angle of the operating lever 16 larger than that of the virtual inclined line L (see FIG. 4).

However, the inclination formed in the cam surface 28 is formed at a position (region) above the virtual inclined line L in its entire region. When the cam surface 28 is compared with the virtual inclined line L at the point having the same rotation amount of the cam follower 21, a lift amount (an axial movement amount of the cam follower 21) of the cam surface 28 is larger and an axial force of the cam surface 28 is also larger than those of the virtual inclined line L. In the entire region from the beginning to the end of the cam surface 28, the operating force of the operating lever 16 is larger than that of the virtual inclined line L from the initial stage to the late phase stage (see FIG. 4).

In addition, when the tilt lock is established, in the initial stage of the operation, the cam follower 21 moves on the first inclined portion 29 steeper than the virtual inclined line L from the flat surface so that the operating force of the operating lever 16 in the initial phase of the tilt lock becomes large.

When the tilt lock is released, a force for movement from the rear region of the stroke where the operating force of the operating lever 16 is high to the front region where the operating force of the operating lever 16 is low is applied to the cam follower 21. In addition, the cam follower 21 moves from the second inclined portion 30 having a small inclination angle to the first inclined portion 29 having a large inclination angle and the flat surface so that there is a possibility that the operating lever 16 returns extremely quickly when the tilt lock is released.

SUMMARY OF THE INVENTION

An object of the present invention (the technical problem to be solved) is to suppress a lever operation load to improve operability without increasing a lever operation angle in a steering apparatus that has tilting and telescoping adjustment functions and is equipped with a cam mechanism.

As a result of elaborate studies conducted in order to solve the above-described problem, inventors have solved the above-described problem by providing, as a first aspect of the invention, a steering apparatus including a fixed bracket that has fixed side portions on both sides in a width direction and supports a steering column, a fastener that has a lock bolt extending through the fixed side portions, a primary cam that rotates with a rotation operation of the fastener, and a secondary cam that is non-rotatably attached to one of the fixed side portions and is in contact with the primary cam, wherein a cam operating portion including an inclined surface portion, a high level surface, and a contact protrusion is formed at a regular interval along a circumferential direction on a base flat surface of each of the primary cam and the secondary cam, and the inclined surface portion is constituted by a low gradually inclined surface, a middle sharply inclined surface, and a high gradually inclined surface arranged in this order from the base flat surface toward the high level surface.

The inventors have solved the above-described problem by providing, as a second aspect of the invention, the steering apparatus of the first aspect of the invention wherein the low gradually inclined surface and the high gradually inclined surface provided at both ends of the middle sharply inclined surface are formed to have different inclination angles, and the high gradually inclined surface is formed to have the inclination angle relatively larger than the inclination angle of the low gradually inclined surface. The inventors have solved the above-described problem by providing, as a third aspect of the invention, the steering apparatus of the first or second aspect of the invention wherein, in the inclined surface portion, the inclination angle of the low gradually inclined surface is formed to be smaller than an inclination of a straight virtual inclined line connecting a lowest position and a highest position, and the middle sharply inclined surface intersects the virtual inclined line.

In the first aspect of the invention, the inclined surface portion of each of the primary cam and the secondary cam is constituted by the low gradually inclined surface, the middle sharply inclined surface, and the high gradually inclined surface arranged in this order from the base flat surface toward the high level surface. In a process from an unlocked state to a locked state, the contact protrusion of one of the primary cam and the secondary cam comes in contact with the other one thereof, and moves on the inclined surface portion from the base flat surface to the high level surface of the other one thereof by a relative rotation.

At this point, when the contact protrusion moves up the inclined surface portion, the contact protrusion moves from the low gradually inclined surface having a small inclination angle to the middle sharply inclined surface having a large inclination angle. The contact protrusion does not move up the middle sharply inclined surface having a large inclination angle directly from the base flat surface, but moves up the middle sharply inclined surface via the low gradually inclined surface.

With the arrangement, the contact protrusion moves on the middle sharply inclined surface with an impetus in the low gradually inclined surface applied to the contact protrusion, and hence the movement of the contact protrusion from the low gradually inclined surface to the middle sharply inclined surface is smoothly performed so that an operation feeling of an operating lever can be made excellent. In addition, in a process from the locked state to the unlocked state, the low gradually inclined surface plays a role of reducing the impetus and shock in the downward movement of the contact protrusion.

That is, when the contact protrusion moves down the inclined surface portion, the contact protrusion does not move to the base flat surface directly from the middle sharply inclined surface having a large inclination angle, but reaches the base flat surface via the low gradually inclined surface having a small inclination angle. Consequently, the contact protrusion reaches the base flat surface while the impetus of the contact protrusion is gradually reduced on the low gradually inclined surface so that it is possible to prevent the operating lever from returning extremely quickly.

Thus, since the inclined surface portion is constituted by the low gradually inclined surface, the middle sharply inclined surface, and the high gradually inclined surface, the operation feeling of the operating lever in tilting and telescoping adjustments becomes excellent as compared with the case of the conventional inclined surface that is monotonically inclined, or an inclined surface in which a sharply inclined surface precedes in an upward inclination direction.

In the second aspect of the invention, since the inclination angle of the low gradually inclined surface is smaller than those of the middle sharply inclined surface and the high gradually inclined surface, the contact protrusion can smoothly move between the base flat surface and the middle sharply inclined surface in locking and unlocking so that the operation feeling becomes excellent. In addition, since the high gradually inclined surface is formed to have an inclination angle larger than that of the low gradually inclined surface, it is possible to cause an operator to realize that fastening is not finished yet, and reliably complete the rotation operation of the operating lever.

In the third aspect of the invention, the entire range of the low gradually inclined surface and the partial range of the middle sharply inclined surface are formed at a position below the virtual inclined line, and it is thereby possible to reduce a range where an operating force of the operating lever is larger than that of the virtual inclined line.

BRIEF DESCRIPTION OF THE DRAWINGS

FIG. 1A is a longitudinal elevational view of the present invention, FIG. 1B is an enlarged schematic view of an α part of FIG. 1A, and FIG. 1C is a perspective plan view of a primary cam (or a secondary cam);

FIG. 3A is a schematic view of a steering apparatus showing an initial operation of an operating lever in a locking operation process, FIG. 3B is a view showing operation states of the primary cam and the secondary cam in a state of FIG. 3A, FIG. 3C is a schematic view of the steering apparatus showing an intermediate operation of the operating lever in the locking operation process, FIG. 3D is a view showing operation states of the primary cam and the secondary cam in a state of FIG. 3C, FIG. 3E is a schematic view of the steering apparatus showing an operation of the operating lever immediately before the end of the locking operation process, and FIG. 3F is a view showing operation states of the primary cam and the secondary cam in a state of FIG. 3E; and FIG. 4 is a view in which an inclined surface portion of of the primary cam or the secondary cam of the present invention is compared with a cam surface of the conventional art relative to a virtual inclined line.

DESCRIPTION OF THE PREFERRED EMBODIMENT

Figure 2A:
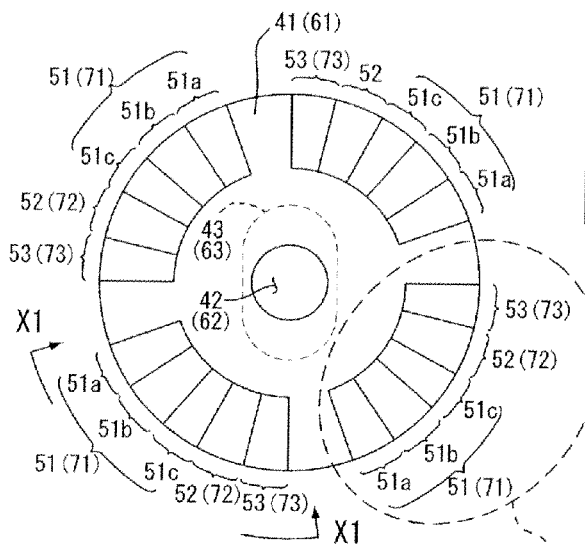
FIG. 2A is a plan view of the primary cam (or the secondary cam)

A description is given hereinbelow of an embodiment of the present invention with reference to the drawings. The present invention is a steering apparatus having a tilting adjustment function (a telescoping adjustment function is added in some cases) that is constituted mainly by a fixed bracket 1, a movable bracket 2, a fastener 3, a primary cam A, and a secondary cam B (see FIG. 1A).

The movable bracket 2 constituted integrally with a steering column 81 is supported by the fixed bracket 1 so as to be capable of a tilting adjustment. In the tilting adjustment, locking (fastening) and unlocking (unfastening) of the fixed bracket 1 by the movable bracket 2 is performed by bringing the primary cam A and the secondary cam B close to each other and moving them away from each other in response to the operation of the fastener 3 (see FIGS. 1A and 1B).

The fixed bracket 1 is formed of fixed side portions 11, a coupling portion 12, and attachment portions 13. The fixed side portions 11 are substantially flat, disposed in parallel with each other, and coupled to the coupling portion 12 at their upper positions by welding means or the like. Tilting-adjustment elongated holes 11a are formed along a substantially vertical direction in both of the fixed side portions 11. In addition, the horizontal attachment portions 13 are formed so as to extend outward from the upper ends of both of the fixed side portions 11, and the fixed bracket 1 is fixed to both of the attachment portions 13 via a capsule for absorbing a shock in a collision in a predetermined position of an automobile.

The movable bracket 2 is formed of movable side portions 21 and a bottom portion 22, and both of the movable side portions 21 are disposed in parallel with each other and are coupled to each other at the bottom portion 22. Both of the movable side portions 21 support a steering column, and the steering column is attached to the upper parts of both of the movable side portions 21 by fixing means such as welding or the like. Both of the movable side portions 21 are formed with tilting-adjustment through holes 21a.

Both of the movable side portions 21 of the movable bracket 2 are dispose so as to be held between both of the fixed side portions 11 of the fixed bracket 1, a lock bolt 31 of the fastener 3 extends through the tilting-adjustment elongated holes 11a and the tilting-adjustment through holes 21a, and the fixed bracket 1 and the movable bracket 2 are coupled to each other such that they can be fastened together or unfastened from each other (see FIG. 1A). To the steering column 81, a steering shaft 82 is rotatably attached, and a steering wheel 83 is attached to the tip of the steering shaft 82 (see FIG. 3).

The fastener 3 is constituted mainly by the lock bolt 31 and an operating lever 32 (see FIG. 1A). The lock bolt 31 is constituted by a bolt shaft portion 31a, a bolt screw portion 31b, and a bolt head portion 31c. The bolt screw portion 31b is formed at one end of the bolt shaft portion 31a in an axial direction and the bolt head portion 31c is formed at the other end thereof in the axial direction. In the bolt shaft portion 31a, a press-fitting region 31d is formed at a position close to the bolt head portion 31c. The primary cam A described later is press-fitted and fixed in the press-fitting region 31d, and the primary cam A rotates with the rotation of the lock bolt 31 in a circumferential direction of the shaft.

Next, a description is given of configurations of the primary cam A and the secondary cam B. As shown in FIG. 1B, the primary cam A and the secondary cam B are formed to have the same shape and the same configuration. Accordingly, the details of the primary cam A and the secondary cam B are provided with different reference numerals (see FIGS. 1B and 1C and FIGS. 2A and 2B). The primary cam A is constituted by a cam base portion 4 and a plurality of cam operating portions 5. Similarly, the secondary cam B is also constituted by a cam base portion 6 and a plurality of cam operating portions 7.

The cam base portion 4 of the primary cam A and the cam base portion 6 of the secondary cam B have the same shape, and each of the cam operating portions 5 of the primary cam A and each of the cam operating portions 7 of the secondary cam B have the same shape. In addition, there are cases where the secondary cam B is formed to have a diameter larger than that of the primary cam A. Hereinbelow, although the primary cam A is mainly described, the portions of the secondary cam B are substantially identical with the corresponding portions of the primary cam A so that the description of the primary cam A applies to the secondary cam B.

The cam base portion 4 is formed into a substantially disk-like shape, and an attachment hole 42 is formed at the central position of the cam base portion 4. The attachment hole 42 is press-fitted in the press-fitting region 31d of the lock bolt 31, and the primary cam A rotates in the circumferential direction of the shaft of the lock bolt 31. A circular surface of the cam base portion 4 on one side is referred to as a base flat surface 41. The base flat surface 41 is a flatly formed surface. The plurality of the cam operating portions 5 are formed at regular intervals along a circumferential direction at positions close to the outer periphery on the base flat surface 41.

Specifically, the part of the base flat surface 41 close to the outer periphery thereof is quartered in a radial direction, and the cam operating portion 5 is disposed in each of the regions obtained by the quartering (see FIG. 1C and FIG. 2A). That is, four cam operating portions 5 are formed in the cam base portion 4. The number of cam base portions 5 is determined in consideration of the stability of an assembled state or the operability in the tilting adjustment, and hence the number thereof is not necessarily limited to four and may be four or less or more.

Each cam operating portion 5 is formed to protrude in a direction orthogonal to the surface of the base flat surface 41. The cam operating portion 5 is constituted by an inclined surface portion 51, a high level surface 52, and a contact protrusion 53, and the inclined surface portion 51, the high level surface 52, and the contact protrusion 53 are formed in this order along the circumferential direction of the base flat surface 41 (see FIG. 1C and FIGS. 2A and 2B). The order of the arrangement thereof applies to all of the cam operating portions 5 formed in the base flat surface 41 (see FIG. 10 and FIG. 2A).

The inclined surface portion 51 is a surface that has an inclination relative to the base flat surface 41, and the highest part of the inclined surface leads to the high level surface 52. The contact protrusion 53 is formed into a substantially rectangular parallelepiped shape so as to protrude from the high level surface 52, and a top surface portion 53a thereof comes in contact with the secondary cam B side (see FIG. 1B).

The inclined surface portion 51 is a portion that determines a range of an operating stroke of the operating lever 32 in locking and unlocking. The inclined surface portion 51 is constituted by surfaces having three different inclinations including a low gradually inclined surface 51a, a middle sharply inclined surface 51b, and a high gradually inclined surface 51c, and the low gradually inclined surface 51a and the high gradually inclined surface 51c are formed at both ends of the middle sharply inclined surface 51b. That is, the low gradually inclined surface 51a, the middle sharply inclined surface 51b, and the high gradually inclined surface 51c are arranged in this order from the base flat surface 41 toward the high level surface 52 of the cam operating portion 5 (see FIG. 1C and FIGS. 2A and 2B).

Figure 2B:
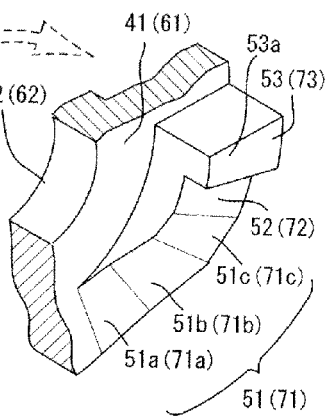
FIG. 2B is an enlarged perspective view of a β part of FIG. 2A.
Figure 2C:
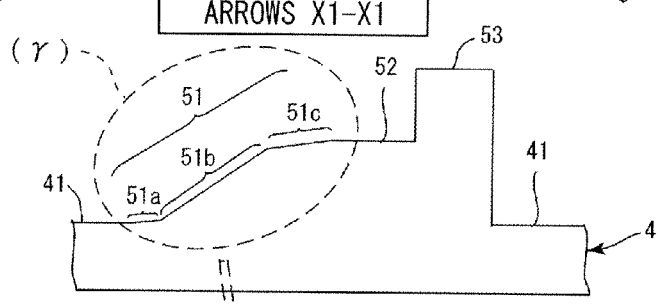
FIG. 2C is a view taken along arrows X1-X1 of FIG. 2A.
Figure 2D:
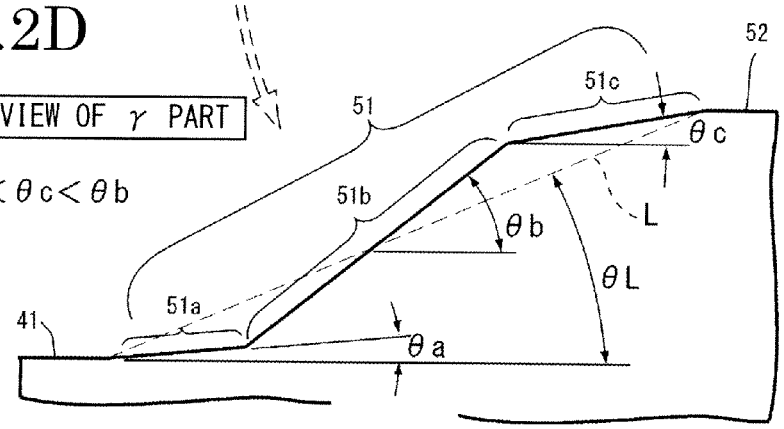
FIG. 2D is an enlarged view of a γ part of FIG. 2C.

An inclination angle θa of the low gradually inclined surface 51a formed on the base flat surface 41 side of the middle sharply inclined surface 51b is an inclination angle smaller than an inclination angle θb of the middle sharply inclined surface 51b and an inclination angle θc of the high gradually inclined surface 51c (see FIG. 2D). That is, the low gradually inclined surface 51a is a surface having the smallest inclination angle. Herein, a reference plane of the inclination angle θa of the low gradually inclined surface 51a is the base flat surface 41, and the inclination angles θa, θb, and θc are inclination angles relative to the base flat surface 41. In particular, the inclination angle θa of the low gradually inclined surface 51a is set to an extremely small angle.

The setting of the inclination angle θ of each of the low gradually inclined surface 51a, the middle sharply inclined surface 51b, and the high gradually inclined surface 51c is as described below. First, an inclined surface in a case where the inclined surface portion 51 is assumed to be a surface monotonically inclined from the beginning of the inclined surface portion 51 (the boundary between the inclined surface portion 51 and the base flat surface 41) to the end thereof (the boundary between the inclined surface portion 51 and the high level surface 52) is set as a virtual inclined line L (see FIG. 2D and FIG. 4). The rotation amounts of the primary cam. A and the secondary cam B in the virtual inclined line L are the same as those in the inclined surface portion 51, and the operation angle of the operating lever 32 in the virtual inclined line L is also the same as that in the inclined surface portion 51.

The low gradually inclined surface 51a is formed to be gentler than the virtual inclined line L, and the inclination angle thereof is smaller than an inclination angle $\theta L$ of the virtual inclined line L. That is, $\theta a > \theta L$ is satisfied. In other words, the low gradually inclined surface 51a is set at a position below a range corresponding to the virtual inclined line L over the entire range of the low gradually inclined surface 51a.

The middle sharply inclined surface 51b is formed to be steeper than the virtual inclined line L, and the inclination angle $\theta b$ thereof is larger than the inclination angle $\theta L$. That is, $\theta b > \theta L$ is satisfied. The middle sharply inclined surface 51b intersects the virtual inclined line L at the midpoint of its entire range. In the middle sharply inclined surface 51b, the front region thereof closer to the base flat surface 41 than the intersection position is below the virtual inclined line L, while the rear region thereof closer to the high level surface 52 than the intersection position is above the virtual inclined line L (see FIG. 2D).

The inclination angle $\theta c$ of the high gradually inclined surface 51c formed on the high level surface 52 side of the middle sharply inclined surface 51b is formed to be gentler than the virtual inclined line L, and the inclination angle $\theta c$ thereof is smaller than the inclination angle $\theta L$ of the virtual inclined line L. Further, the inclination angle $\theta c$ thereof is formed to be larger than the inclination angle $\theta a$ of the low gradually inclined surface 51a and smaller than the inclination angle $\theta b$ of the middle sharply inclined surface 51b. That is, $\theta a < \theta c < \theta b$ is satisfied. The high gradually inclined surface 51c is above the range corresponding to the virtual inclined line L over its entire range.

On a side surface opposite to the side surface formed with the cam operating portions 5 of the cam base portion 4, there is formed a noncircular fixing expanded portion 43 that is concentric with the cam base portion 4 (see FIG. 2B). The fixing expanded portion 43 is formed into an oval shape, a rectangular shape, an elliptical shape, or a circular shape having a flat part. The fixing expanded portion 43 is attached so as to be inserted into a fixing hole 32a formed in the operating lever 32, and the operating lever 32 and the primary cam A rotate integrally with each other (see FIG. 1B). The fixing hole 32a of the operating lever 32 is formed into substantially the same shape as that of the fixing expanded portion 43. In the secondary cam B, an attachment hole 62 is formed in the center of the cam base portion 6.

Although the bolt shaft portion 31a of the lock bolt 31 extends through the attachment hole 62, the bolt shaft portion ha is not press-fitted into the attachment hole 62, and they are constituted so as to be rotatable relative to each other. The circular surface of the cam base portion 6 on one side is referred to as a base flat surface 61. The plurality of the cam operating portions 7 are formed at regular intervals along the circumferential direction at positions close to the outer periphery on the base flat surface 61. In addition, on a side surface opposite to the side surface formed with the cam operating portions 7 of the cam base portion 6, there is formed a noncircular fixing expanded portion 63 that is concentric with the cam base portion 6.

Each cam operating portion 7 is constituted by an inclined surface portion 71, a high level surface 72, and a contact protrusion 73. The number of cam operating portions 7 is the same as the number of cam operating portions 5 of the primary cam A, and the arrangement thereof is also the same as that of the cam operating portions 5. That is, when the number of cam operating portions 5 of the primary cam A is four, the number of cam operating portions 7 of the secondary cam B is also four. Further, the inclined surface portion 71 also has a low gradually inclined surface 71a, a middle sharply inclined surface 71b, and a high gradually inclined surface 71c, and the inclination angles and the like thereof are constituted under the same conditions as those of the low gradually inclined surface 51a, the middle sharply inclined surface 51b, and the high gradually inclined surface 51c of the primary cam A.

Next, the configuration of the entire apparatus is described. Both of the movable side portions 21 of the movable bracket 2 are disposed between both of the fixed side portions 11 of the fixed bracket 1, and the movable side portions 21 and the fixed side portions 11 are joined together such that the positions of the tilting-adjustment elongated holes 11a formed in the fixed side portions 11 match with those of the tilting-adjustment through holes 21a formed in the movable side portions 21. The movable side portions 21 and the fixed side portions 11 are set such that the bolt shaft portion 31a of the lock bolt 31 of the fastener 3 extends through the tilting-adjustment elongated holes 11a and the tilting-adjustment through holes 21a of both of the fixed side portions 11 and the movable side portions 21 (see FIG. 1A).

To the tilting-adjustment elongate hole 11a of one of the fixed side portions 11 of the fixed bracket 1, the secondary cam B is non-rotatably attached. In this state, the fixing expanded portion 63 of the secondary cam B is inserted into the tilting-adjustment elongated hole 11a, and the secondary cam B is thereby installed so as to be non-rotatable relative to the fixed bracket 1 (see FIG. 1B).

In addition, the bolt shaft portion 31a of the lock bolt 31 is loosely extended through the attachment hole 62 of the secondary cam B. The primary cam A is press-fitted and fixed in the press-fitting region 30d of the lock bolt 31. Further, the operating lever 32 is attached to the primary cam A, and the primary cam A is capable of rotating the lock bolt 31 in the circumferential direction of the shaft by the rotation operation of the operating lever 32.

The lock bolt 31 is properly attached to the fixed bracket 1 and the movable bracket 2, and the surface formed with the cam operating portions 5 of the primary cam A and the surface formed with the cam operating portions 7 of the secondary cam B are installed such that they oppose each other. That is, each cam operating portion 5 and each cam operating portion 7 are brought into contact with each other so as to be stacked on each other (see FIG. 1B).

In addition, on the side opposite to the side formed with the bolt head portion 31c of the lock bolt 31, fixtures such as a washer, a thrust bearing, a thrust washer, and a locknut are attached from the outside of the fixed side portion 11 of the fixed bracket 1, and the lock bolt 31 is rotatably fixed to the fixed bracket 1 and the movable bracket 2 (see FIG. 1A). The lock bolt 31 and the primary cam A rotate together by the rotation operation of the operating lever 32 of the fastener 3.

By rotating the operating lever 32 in the circumferential direction of the shaft of the lock bolt 31 upward, i.e., counterclockwise, the primary cam A rotates and the primary cam A and the secondary cam B thereby rotate relative to each other so that the cam operating portions 5 and the cam operating portions 7 move relative to each other.

A description is given of a process from an unlocked state to a locked state in the relative rotation movements of the primary cam A and the secondary cam B. The operating lever 32 is positioned at a lower position in the unlocked state and, when the operating lever 32 is rotated upward, the locked state is established.

When the primary cam A rotates in a locking direction by the operation of the operating lever 32, the top surface portion 53a of the contact protrusion 53 of the cam operating portion 5 moves past the inclined surface portion 71 of the cam operating portion 7 while being in contact with the base flat surface 61 of the secondary cam B, and reaches the position of the high level surface 72. In addition, by the rotation of the primary cam A, the top surface portion 73a of the contact protrusion 73 of the cam operating portion 7 moves past the inclined surface portion 51 of the cam operating portion 5 while being in contact with the base flat surface 41 of the primary cam A, and reaches the position of the high level surface 52. With the arrangement, the primary cam A and the secondary cam B are moved away from each other.

Thus, the primary cam A and the secondary cam B are moved away from each other along the axial direction of the lock bolt 31, and the fixed side portions 11 of the fixed bracket 1 and the movable side portions 21 of the movable bracket 2 are thereby pressed against each other so that the locked state can be established.

Next, a description is given of a process from the locked state to the unlocked state. By rotating the operating lever 32 downward, i.e., clockwise, the primary cam A rotates in a direction opposite to the direction in the previous case. In the relative rotation movements of the primary cam A and the secondary cam B, between the cam operating portion 5 and the cam operating portion 7, the top surface portion 53a of the contact protrusion 53 of the cam operating portion 5 moves past the inclined surface portion 71 from the position of the high level surface 72 of the cam operating portion 7 and reaches the position of the base flat surface 61, and the primary cam A and the secondary cam B are thereby brought close to each other.

In addition, by the rotation of the primary cam A, the top surface portion 73a of the contact protrusion 73 of the cam operating portion 7 moves past the inclined surface portion 51 from the position of the high level surface 52 of the cam operating portion 5 and reaches the position of the base flat surface 41. Thus, the primary cam A and the secondary cam B are brought close to each other along the axial direction of the lock bolt 31, and the contact between the fixed side portions 11 of the fixed bracket 1 and the movable side portions 21 of the movable bracket 2 is loosened so that the unlocked state can be established, and it is possible to allow the movable bracket 2 to tilt and telescope relative to the fixed bracket In the relative rotation movements in locking and unlocking by the primary cam A and the secondary cam B, the contact protrusion 53 of the cam operating portion 5 and the contact protrusion 73 of the cam operating portion 7 come in contact with each other in any relative rotation movement so that they play a role as a mutual stopper and the locking position and the unlocking position can be accurately controlled. With the arrangement, it is possible to secure stable performance with an inexpensive configuration.

Next, a description is given of the function of each of the inclined surface portion 51 of the cam operating portion 5 of the primary cam A and the inclined surface portion 71 of the cam operating portion 7 of the secondary cam B with reference to FIGS. 3 and 4. The description of the function is based on the process from the unlocked state to the locked state. In addition, in the following description, although a description is given of the operation of the contact protrusion 73 of the secondary cam B to the base flat surface 91 and the cam operating portion 5 of the primary cam A, in the opposite case as well, i.e., in the case of the operation of the contact protrusion 53 of the primary cam A to the base flat surface 61 and the cam operating portion 7 of the secondary cam B, the similar operation is carried out.

The primary cam A rotates by the rotation operation of the operating lever 32. The contact protrusion 73 (the contact protrusion 53) of the secondary cam B when the locking and the unlocking are performed moves relative to the base flat surface 41 (the base flat surface 61), the inclined surface portion 51 (the inclined surface portion 71), and the high level surface 52 (the high level surface 72) of the primary cam A (the secondary cam B) (see FIG. 3).

First, a description is given of the positional relationship between the primary cam A and the secondary cam B, and the operating lever 32 when the locking and the unlocking are performed with reference to FIG. 3. The operation angle of the operating lever 32 when the contact protrusion 73 (the contact protrusion 53) of the secondary cam B moves relative to the inclined surface portion 51 (the inclined surface portion 71) of the primary cam A (the secondary cam B) is assumed to be α (see FIG. 3).

The rotation angle of the operating lever 32 in an initial movement is α1, and the position of the contact protrusion 73 on the inclined surface portion 51 at this point is at an upper end of the low gradually inclined surface 51a (see FIGS. 3A and 3B). In addition, the rotation angle of the operating lever 32 in the middle sharply inclined surface 51b is α2, and the position of the contact protrusion 73 on the inclined surface portion 51 at this point is at an upper end of the middle sharply inclined surface 51b (see FIGS. 3C and 3D). Further, the rotation angle of the operating lever 32 in the high gradually inclined surface 51c is α3, and the position of the contact protrusion 73 on the inclined surface portion 51 at this point is at an upper end of the high gradually inclined surface 51c (see FIGS. 3E and 3F).

In the inclined surface portion 51, the low gradually inclined surface 51a is formed at a position (region) below the virtual inclined line L, and an amount of lifting the contact protrusion 73 of the secondary cam B of the low gradually inclined surface 51a is small as compared with that of the virtual inclined line L at a point having the same rotation amount of the primary cam A as that of the low gradually inclined surface 51a (see FIG. 2D). The lift mount mentioned herein corresponds to an axial movement amount of the primary cam A, i.e., a spaced-apart distance between the primary cam A and the secondary cam B.

The small lift amount means that the spaced-apart distance between the primary cam A and the secondary cam B is small. The middle sharply inclined surface 51b intersects the virtual inclined line L at the midpoint of its entire range, and the range thereof closer to the low gradually inclined surface 51a than the intersection point is formed at a position below the virtual inclined line L.

Consequently, in the initial movement of the operating lever 32 in locking, it is possible to reduce a force for rotating the primary cam A as compared with the virtual inclined line L having the same rotation amount of the primary cam A in the range of the low gradually inclined surface 51a and the front region of the middle sharply inclined surface 51b, and it is possible to reduce the operating force of the operating lever 32. With this, in a state where the operating force of the operating lever 32 is kept smaller than that of the virtual inclined line L, it is possible to rotate the operating lever 32 from the low gradually inclined surface 51a to the front region of the middle sharply inclined surface 51b (see FIG. 2D and FIG. 4).

In the process from the initial operation to the intermediate operation in locking, the contact protrusion 73 of the secondary cam B enters from the base flat surface 41 of the primary cam A into the middle sharply inclined surface 51b having the largest inclination angle via the low gradually inclined surface 51a (see FIG. 3D). Therefore, it is possible to perform a smooth operation with a small operating resistance as compared with a case where the contact protrusion 73 enters into the steep middle sharply inclined surface 51b directly from the base flat surface 41.

That is, the low gradually inclined surface 51a serves as an introductory part for the contact protrusion 73 of the secondary cam B reaching the steep middle sharply inclined surface 51b. The range from the low gradually inclined surface 51a to the front region of the middle sharply inclined surface 51b is formed at a position (region) below the virtual inclined line L and, when the range thereof is compared with the virtual inclined line L at a point having the same rotation amount, the lift amount of the range is smaller than that of the virtual inclined line L (see FIG. 2D and FIG. 4).

That is, in the range from the low gradually inclined surface 51a to the front region of the middle sharply inclined surface 51b, the axial force is small as compared with that of the virtual inclined line L so that the operating force of the operating lever 32 is small. With this, it is possible to move the operating lever 32 from the low gradually inclined surface 51a to the front region of the middle sharply inclined surface 51b while the operating force of the operating lever 32 is kept small as compared with that of the virtual inclined line L.

The range of the rear region of the middle sharply inclined surface 51b and the high gradually inclined surface 51c is formed at a position (region) above the virtual inclined line L and, when the range thereof is compared with the virtual inclined line L at a point having the same rotation amount, the lift amount of the range is larger than that of the virtual inclined line L. That is, in the range from the rear region of the middle sharply inclined surface 51b to the high gradually inclined surface 51c, the axial force is large as compared with that of the virtual inclined line L, and the operating force of the operating lever 32 is also large.

However, the contact protrusion 73 of the secondary cam B moves past the low gradually inclined surface 51a to the front region of the middle sharply inclined surface 51b while the operating force of the operating lever 32 is small as compared with that of the virtual inclined line L, and hence the contact protrusion 73 can move past the rear region of the middle sharply inclined surface 51b to the high gradually inclined surface 51c in a state where an impetus for rotating the operating lever 32 is applied to the contact protrusion 73.

The contact protrusion 73 having climbed up on top of the middle sharply inclined surface 51b can easily move on the high gradually inclined surface 51c (see FIG. 3F). With this, the operability of the operating lever 32 in the inclined surface portion 51 is improved as a whole. In addition, the inclination angle of the high gradually inclined surface 51c is formed to be larger than the inclination angle of the low gradually inclined surface 51a, and hence it is possible to reliably move the contact protrusion 73 to the high level surface 52.

When the inclination angle of the high gradually inclined surface 51c is formed to be the same as or smaller than the inclination angle of the low gradually inclined surface 51a, the difference in inclination angle between the high gradually inclined surface 51c and the high level surface 52 as a flat surface is reduced. As a result, there is a possibility that, in the middle of the operation in which the contact protrusion 73 moves on the high gradually inclined surface 51c, an operator feels that fastening is completed to suspend the rotation operation of the operating lever 32 in the middle of the operation. The inclination angle of the high gradually inclined surface 51c is formed to be larger than the inclination angle of the low gradually inclined surface 51a so that the difference in inclination angle between the high gradually inclined surface 51c and the high level surface 52 is increased, and it is thereby possible for the operator to realize that the fastening is not completed and reliably complete the rotation operation of the rotating lever 32.

According to the present invention, in the inclined surface portion 51, the low gradually inclined surface 51a and the high gradually inclined surface 51c are formed at both ends of the middle sharply inclined surface 51b and the inclination angle of the low gradually inclined surface 51a is formed to be the smallest inclination angle, and the range of the low gradually inclined surface 51a and the front region of the middle sharply inclined surface 51b is thereby formed at a position (region) below the virtual inclined line L having the same rotation amount and the same operating lever angle as those of the range thereof. The range where the operating force of the operating lever 32 is larger than that of the virtual inclined line L is set to the range from the rear region of the middle sharply inclined surface 51b to the high gradually inclined surface 51c, it is thereby possible to reduce a region where the operator feels that the fastening is slow to reduce the operating force of the operating lever 32 as a whole.

Thus, in the movement of the contact protrusion 73 on the inclined surface portion 51, since it is possible to reduce the region where the operator feels that the fastening is slow as compared with the virtual inclined line L in the present invention, the operability of the operating lever 32 is improved without increasing the operation angle of the operating lever 32. In contrast to this, in Japanese Patent Application Laid-open No. 2002-59851, the entire region of the inclined surface is formed at a position (region) above the virtual inclined line L having the same rotation amount and the same operating lever angle as those of the inclined surface, and operation feeling in tilting and telescoping adjustments is heavy (see FIG. 4).

Next, a description is given of the process from the locked state to the unlocked state. The contact protrusion 73 of the secondary cam B reaches the base flat surface 41 from the high level surface 52 via the middle sharply inclined surface 51b having the largest inclination angle and the low gradually inclined surface 51a having the smallest inclination angle in the primary cam A.

That is, the low gradually inclined surface 51a is present between the middle sharply inclined surface 51b and the base flat surface 41 and the low gradually inclined surface 51a plays a role as a buffer surface when the contact protrusion 73 of the secondary cam B reaches the base flat surface 41, and it is thereby possible to prevent the operating lever 32 from returning extremely quickly in the operation of the operating lever 32.

Thus, although the description has been given by using, as an example, the steering apparatus in which the lock bolt 3 extends through the fixed side portions 11 of the fixed bracket 1 and the movable side portions 21 of the movable bracket 2, the present invention can also be applied to a steering apparatus in which the lock bolt 3 extends through an outer column made of an aluminum alloy and both of the fixed side portions 11.

In addition, although the description has been given by using, as an example, the steering apparatus in which the locked state is established by rotating the operating lever 32 upward, i.e., counterclockwise, the present invention can also be applied to a steering apparatus in which the arrangement of the primary cam A and the secondary cam B is changed and the locked state is thereby established by rotating the operating lever 32 downward, i.e., clockwise.

Further, the inclined surface of each of the low gradually inclined surface 51$a$, the middle sharply inclined surface 51$b$, and the high gradually inclined surface 51$c$ may be formed as a flat convex surface that is convexly expanded. The flat convex surface mentioned above is an arc-like surface having an extremely large radius of curvature. The present invention should not be interpreted to be limited only to the above-described embodiment, and changes and modifications can be appropriately made to the embodiment.

What is claimed is:

1. A steering apparatus comprising:
    a fixed bracket that has fixed side portions on both sides in a width direction and supports a steering column;
    a fastener that has a lock bolt extending through the fixed side portions;
    a primary cam that rotates with a rotation operation of the fastener; and
    a secondary cam that is non-rotatably attached to one of the fixed side portions and is in contact with the primary cam,
    wherein a cam operating portion comprising an inclined surface portion, a high level surface, and a contact protrusion is formed at a regular interval along a circumferential direction on a base flat surface of each of the primary cam and the secondary cam, and the inclined surface portion is constituted by a low inclined surface, a middle inclined surface, and a high inclined surface arranged in this order from the base flat surface toward the high level surface and an inclination angle of the high inclined surface is formed to be greater than an inclination angle of the low inclined surface, and less than an inclination angle of the middle inclined surface.

2. The steering apparatus according to claim 1, wherein in the inclined surface portion, the inclination angle of the low inclined surface is formed to be smaller than an inclination of a straight virtual inclined line connecting a lowest position and a highest position, and the middle inclined surface intersects the virtual inclined line.

3. The steering apparatus according to claim 1, wherein the primary cam and the secondary cam further comprise a cam base portion including a substantially disk shape, the base flat surface being formed on the cam base portion, and an attachment hole being formed at a central portion of the cam base portion and the lock bolt being inserted into the attachment hole.

4. The steering apparatus according to claim 1, wherein the cam operating portion comprises a plurality of the cam operating portions which protrude in a direction orthogonal to the base flat surface and are formed at regular intervals along the circumferential direction along an outer periphery on the base flat surface.

5. A steering apparatus, comprising:
    a fixed bracket that has fixed side portions on both sides in a width direction and supports a steering column;
    a fastener that has a lock bolt extending through the fixed side portions; and a cam comprising:
    a base flat surface; and
    a cam operating portion comprising an inclined surface portion, a high level surface, and a contact protrusion, the cam operating portion being formed at a regular interval along a circumferential direction on the base flat surface, the inclined surface portion including a low inclined surface, a middle inclined surface, and a high inclined surface arranged in this order from the base flat surface toward the high level surface, and an inclination angle of the high inclined surface being greater than an inclination angle of the low inclined surface, and less than an inclination angle of the middle inclined surface.

6. The steering apparatus of claim 5, wherein the cam comprises one of:
    a primary cam that rotates with a rotation operation of the fastener; and
    a secondary cam that is non-rotatably attached to one of the fixed side portions and is in contact with the primary cam.

7. The steering apparatus of claim 5, wherein the cam further comprises:
    a cam base portion including a substantially disk shape, the base flat surface being formed on the cam base portion, and an attachment hole being formed at a central portion of the cam base portion and the lock bolt being inserted into the attachment hole.

8. The steering apparatus of claim 5, wherein the cam operating portion comprises a plurality of the cam operating portions which protrude in a direction orthogonal to the base flat surface and are formed at regular intervals along the circumferential direction along an outer periphery on the base flat surface.

* * * * *